March 27, 1962

C. A. CONNALLY, JR 3,026,716

ROLLING BALL VISCOMETER

Filed Sept. 16, 1958

United States Patent Office 3,026,716
Patented Mar. 27, 1962

3,026,716
ROLLING BALL VISCOMETER
Carl A. Connally, Jr., Dallas, Tex., assignor, by mesne assignments, to Socony Mobil Oil Company, Inc., New York, N.Y., a corporation of New York
Filed Sept. 16, 1958, Ser. No. 761,338
6 Claims. (Cl. 73—57)

This invention relates to apparatus for determining the viscosity of fluids and more particularly to a viscometer of the rolling ball type in which there is provided means for measuring the time interval for a moving ball to traverse a predetermined distance through a fluid and has for an object the provision of apparatus for accurately measuring the viscosity of fluids.

The present invention provides a new and improved apparatus for detecting the ball as it passes fixed points defining a predetermined distance. More particularly and in accordance with the present invention, there is provided a viscometer for use with an impedance change responsive time measuring system. The viscometer comprises an elongated tube having a passage along its length for receiving a fluid to be tested. A ball, having at least an outside electrically conductive surface, is adapted for rolling movement in the passage from one end of the tube toward the other end thereof through the fluid contained within the tube. A pair of electrically conductive probes are spaced one from the other along the length of the tube and extend into the passage through wall structure of the tube. The probes have needle-like end portions positioned adjacent the path to be taken by the ball for establishing conductive connection with the ball as the center thereof passes over each of the probes. The tube is comprised at least in part of metallic structure disposed in the vicinity of the probes. When the ball establishes conductive connection with each of the probes, an impedance change results between the probes and the metallic portion of the tube.

Further, in accordance with the present invention the probes comprise electrodes which with the metallic portions establish capacitors whose effective capacitance is changed upon contact with each of the probes by the ball.

For further objects and advantages of the present invention, reference may be had to the following detailed description taken in conjunction with the accompanying drawings in which:

FIG. 1 schematically illustrates a complete viscosity measuring system embodying the present invention;

Figure 1:
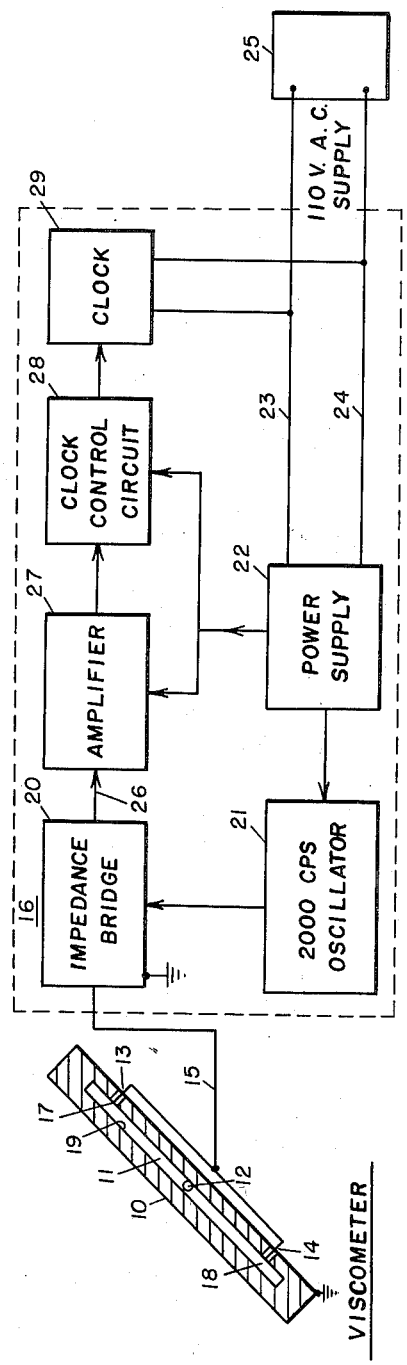

Referring now to FIG. 1, a viscometer 10 embodying the present invention is shown having a passage 11 for receiving a fluid whose viscosity is to be measured. The viscosity of the fluid is related to the time it takes for a ball 12 to move a fixed distance between probes or detectors 13 and 14. The time is measured by a system 16 which responds to impedance changes in the viscometer 10 each time the ball 12 passes the detectors 13, 14.

The detectors 13, 14 include probes or electrodes 17 and 18, respectively, which extend into the passage or chamber 11 and in the path to be taken by the ball 12. Each of the probes has a needle-like end portion which establishes conductive connection with the ball as the center of the ball passes over it. As the ball assumes a position opposite each detector, there is produced a sharp instantaneous change in impedance and one of short duration which makes possible a very accurate measurement of the time interval for the ball 12 to move a predetermined distance between the detectors 13 and 14.

The impedance change produced when a conductive connection is established between the needle-like end portions of the probes or electrodes 17 and 18 may be either resistive or reactive. Resistive impedance change will occur should the ball be in simultaneous contact with the inner metallic surface 19 of the viscometer 10 and the end portion of the electrode or probe 17 or in simultaneous contact with the metallic surface 19 and the end portion of the electrode or probe 18.

The reactive impedance change will take place when the ball 12 is in contact momentarily solely with the end portions 17 or 18. This reactive change may be visualized by considering the probes 17 and 18 to be electrodes respectively of individual capacitors whose other electrode is comprised of the metallic surface 19 of the viscometer 10. When the ball 12 contacts one of the electrodes, for example, the electrode 17, the area of the electrode effectively is increased, thereby increasing one plate of the capacitor. The result is an increase in capacitance and therefore a significant and sharp change in reactance impedance.

The detectors 13 and 14 are connected in parallel and the reactive and resistive impedance changes are applied by way of conductor 15 to an input of an impedance bridge 20, energized by way of an oscillator 21 whose frequency may be any desired value, for example, 2,000 cycles per second. The power for the oscillator 21 is derived from a suitable source of power such as supply 22 shown connected by way of conductors 23 and 24 to the terminals of a supply 25 of A.C. voltage. The output signals from the impedance bridge 20 are applied by way of conductor 26 to an amplifier 27 and thence to a clock control circuit 28. Both the amplifier 27 and clock control circuit 28 are supplied from the power supply 22. The clock control circuit 28 controls the starting and stopping of a clock 29, shown connected to the A.C. supply 25, to indicate the elapsed time for the ball 12 to pass between the detectors 13 and 14.

Figures 2, 3:
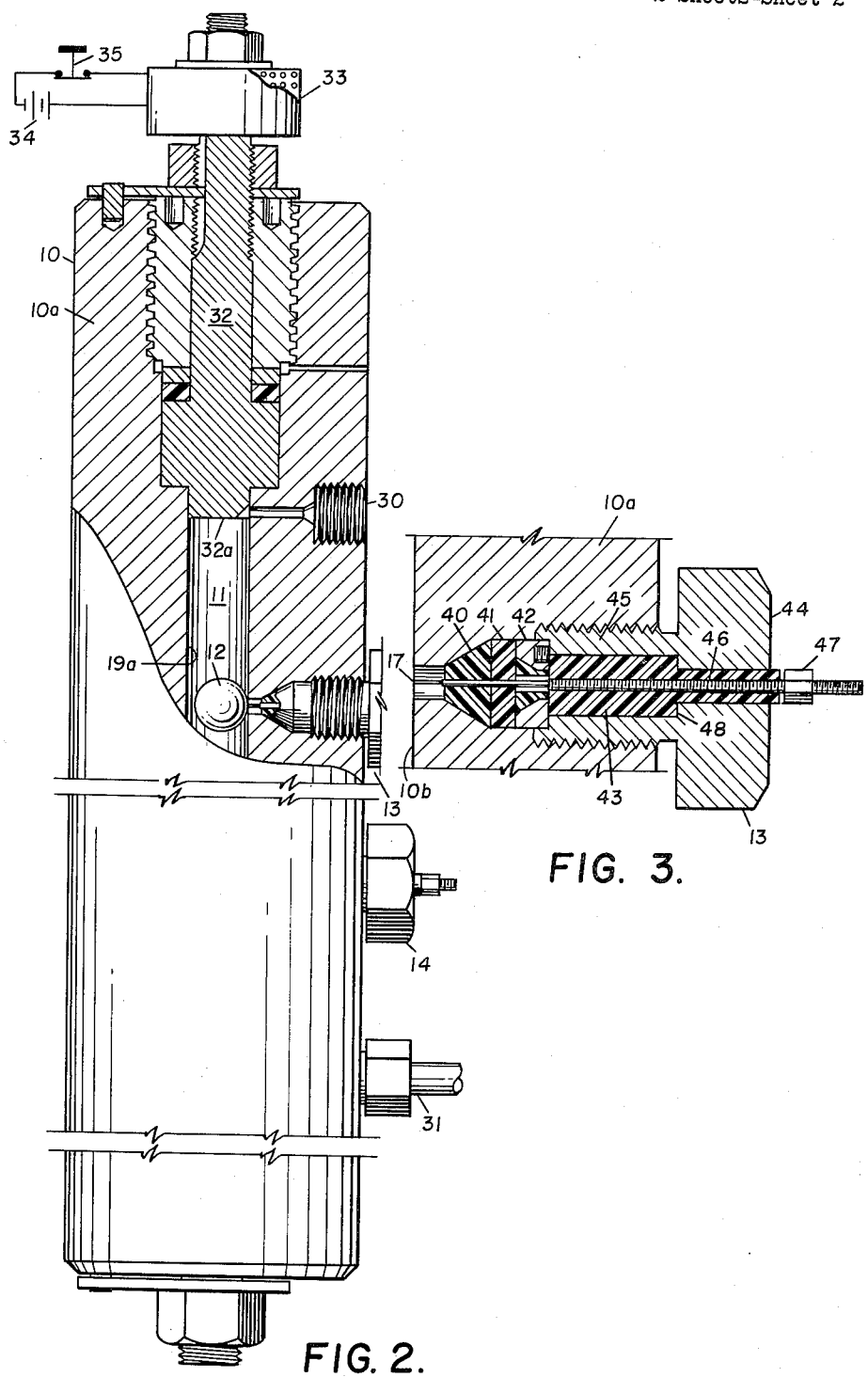
FIG. 2 illustrates the viscometer of the present invention.
FIG. 3 is an enlarged view of one of the probes.

The details of a viscometer embodying the present invention are illustrated in FIG. 2. The viscometer 10 comprises the chamber 11 which in a preferred embodiment is shown defined by thick walls 10a in order to establish within the chamber conditions of high pressure. The fluid or liquid to be tested is added to the chamber or passage 11 by way of inlet 30 and outlet 31 which together with the passage 11 and conduit (not shown) provide a means for removing any gases in the passage 11 or for establishing a liquid sample having a predetermined ratio of gases mixed therein. A magnet comprising an armature 32 and coil 33 provides a means for holding the ball 12 in a position at one end of the passage 11 adjacent the end 32a of the armature 32 until such time as a test is to be conducted. The magnet is energized from a suitable source illustrated as the battery 34 and is controlled as by way of switch 35. When the test is to be conducted, the magnet is de-energized by opening the switch 35, thus releasing the ball 12 for rolling movement along the passage 11 and past the detectors 13 and 14. While not necessary, it is desirable that the detectors 13 and 14 be spaced from the ends of the passage 11 so that the measured time interval will not be affected by any changes in the movement of the ball that may be produced as the ball leaves the end 32a of the armature 32 and when it approaches the opposite end of the passage 11.

Details of the electrode or detector assembly are illustrated in FIG. 3. While it is to be understood that the electrode assembly may take many forms in accordance with the present invention, the embodiment illustrated in FIG. 3 is designed specifically for use with a viscometer cell or chamber 10 employed in the viscosity measurement of liquids under conditions of high temperature and pressure. Thus, the assembly provides two functions; maintenance of a seal between the passageway or cavity 11 of the viscometer cell and the outside atmosphere and maintenance of the probe 17 in an electrically insulated relation with the walls 10a of the viscometer cell. The needle-like end 17 of the probe or electrode is maintained in spaced relation with the wall structure 10a of the viscometer cell 10 by an assembly of insulating bodies including supporting member 40, sealing gasket 41, washer assembly 42, and sleeve 43. The assembly 13 is maintained in fixed position with respect to the wall structure 10a by a packing nut 44 having a portion 45 threadably received by the wall structure 10a.

The supporting member 40 is preferably comprised of an insulating material substantially nondeformable when subjected to high temperatures and pressures. A suitable material is a glass-bonded mica composed of finely powdered mica and glass bonded at high temperature and pressure. This material is presently available from the Mycalex Corporation of America under the trade name Mycalex. The sealing ring 41 is preferably formed of polytetrafluoroethylene, deformable upon pressure being applied by way of the packing nut and the washer assembly 42 to provide a vapor-tight seal between the passage 11 and the atmosphere.

The insulating sleeve 43, also formed of Mycalex, is internally threaded to provide for receipt of the threaded shaft 46 of the probe and thus to afford adjustability of the end 17 of the probe into and out of the passageway to assure pinpoint contact with rolling ball 12. The adjustment of the position of the probe end 17 may be had by turning the nut 47 fixed to or forming an integral part of the probe.

Though subject to extreme pressures, the electrode or probe is prevented from blowout from the assembly through cooperation of the threaded portion of the insulated sleeve 43 and the engagement of a shoulder 48 of the sleeve with complementary surfaces of the packing nut 44.

Figure 4:
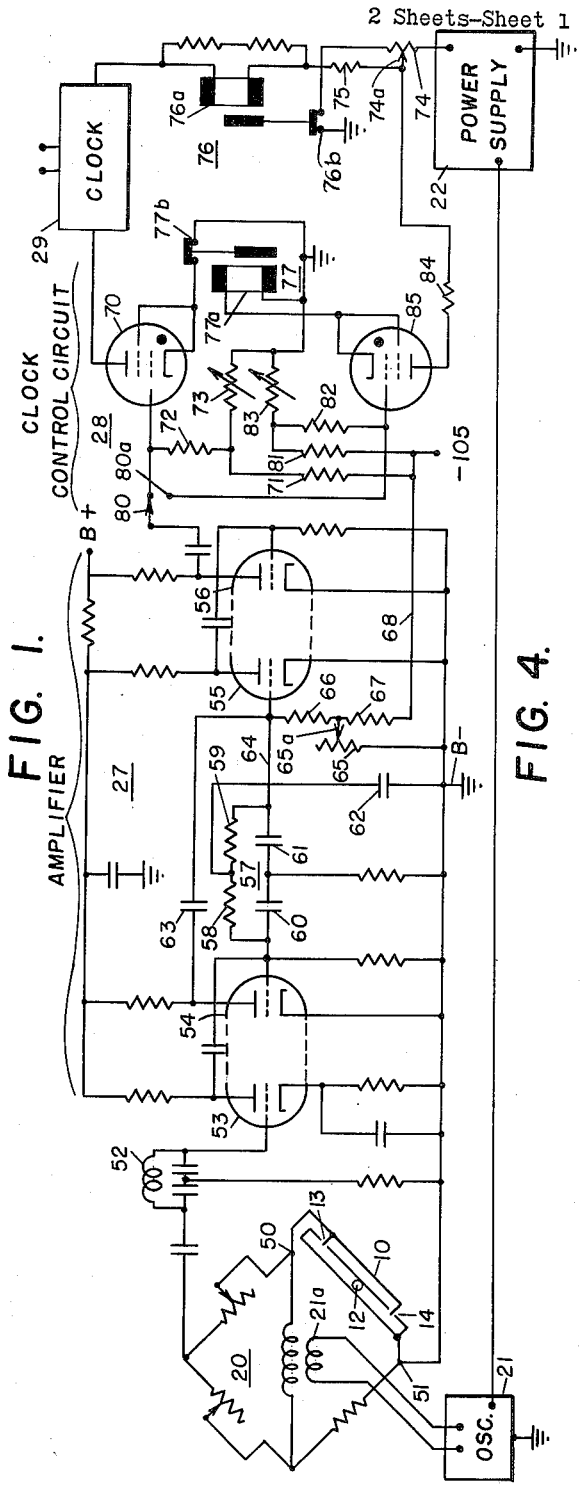
FIG. 4 illustrates a circuit suitable for use with the present invention.

The needle-like end portion 17 of the probe is adjusted accurately with respect to the inner surface 10b of the wall structure 10a to provide for accurate detection of the ball 12, FIG. 2, as it moves past the end 17 of the probe. Thus, when the surface of the ball 12 simultaneously engages both the end 17 of the probe and wall structure of the viscometer, there will be a change in resistance between the probe and the wall structure; and when the ball only touches the probe 17, there will be, as explained above, a reactive change between the probe 17 and the wall structure 10a of the viscometer. Accordingly, it is advantageous to employ in the detecting system an impedance bridge circuit which will be responsive to either resistive or reactive changes in impedance between the wall structure 10a of the viscometer and the end of the probe 17. Such a bridge circuit and one example of means responsive to output signals from the bridge circuit are illustrated in FIG. 4.

The impedance bridge 20 is of the conventional type, including in one of its legs the viscometer 10 with the detectors connected in series to terminal 50 and the wall structure of the viscometer connected to terminal 51. The bridge 20, energized by the output from oscillator 21 and applied to the bridge by way of coupling coil 21a produces an ouput pulse or unbalanced signal each time the ball 12 passes the detectors 13, 14. The pulse or unbalance signal is applied by way of a 60-cycle reject filter 52 to the input of amplifier 27 and more particularly to the first stage 53 thereof.

The amplifier 27 includes the input stage 53 and as many additional stages of voltage amplification as may be necessary to increase the magnitude of the input signal to a level adequate to trigger the clock control circuit 28. In one embodiment, the amplifier includes three additional stages of amplification 54, 55, and 56. Additional 60-cycle filtering and negative feedback is provided by network 57, including resistors 58, 59 and condensers 60 and 61. The junction between serially connected resistors 58, 59 is connected to ground by way of condenser 62. The feedback loop may be traced from the plate circuit of the stage 54 by way of coupling condenser 63 and the network 57 to the grid of the stage 54.

The level of output signal from the amplifier 27 may be adjusted by way of a level controller comprising a variable resistor 65 having a movable contact 65a connected by way of resistor 66 to the grid or input of the stage 55 and by way of resistor 67 and conductor 68 to a source of biasing voltage, here illustrated to have a value of −105 volts.

Each time the rolling ball 12 passes either of the detectors 13, 14 the bridge 20 will become unbalanced and the signal thus produced will be amplified and fed to the clock control circuit for an accurate determination of the time elapsed for the ball 12 to move between the detectors 13 and 14.

The clock control circuit 28 includes means for starting and stopping the action of the clock 29. The starting means includes a thyratron 70 normally biased to a nonconductive state by a negative bias applied to the grid circuit thereof from the source of −105 volts and by way of a circuit which includes resistors 71, 72 and variable resistor 73. With switch 80 in the position shown a pulse will be generated when the ball 12 moves past the detector 13. The pulse is applied to the control grid of the thyratron 70. The positive going pulse is of sufficient magnitude to overcome the negative bias and initiate conduction of the thyratron. Current flow through the thyratron 70 initiates operation of the clock 29 which is connected in the output circuit of the thyratron. The circuit producing current flow through the clock 29 and the thyratron may be traced from the power supply 22 thence by way of the lower portion of potentiometer 74, contact 74a, resistor 75, the operating coil 76a of relay 76, the clock 29, the plate cathode circuit of the thyratron 70, contacts 77b of the relay 77, and thence to ground. In order to maintain current flow through the thyratron beyond the duration of the control pulse produced by the bridge circuit, the plate voltage applied to the thyratron 70 from the power supply 22 is increased. Such increase is effected by operation of the relay 76 which responds to current flow through the clock 29 and the thyratron 70 to open contacts 76b to disconnect the grounded side of the potentiometer 74 and thus raise the voltage applied to the plate circuit of the thyratron 70.

After the clock 29 has begun operation, the operator will move the switch 80 from its illustrated position to a lower position to engage the contact 80a and thus connect the output of the amplifier 27 to a second half of the clock control circuit preparatory to a stopping of the clock mechanism when the ball 12 reaches the detector 14. The stop portion of the clock control circuit includes a second thyratron 85, normally biased to cut off by reason of a negative voltage being applied from the −105 volt source to its control grid circuit by way of a network including resistors 81, 82, and variable resistor 83. When the ball 12 contacts the sharp end of the probe forming part of the detector 14, a pulse of very short duration is produced which being positive in character and greatly amplified at the output of the amplifier 27 is applied to the control grid of the thyratron 85 to overcome the negative bias and cause the thyratron 85 to conduct. The plate-to-cathode current flowing from the power supply 22 through resistor 84 thence to plate cathode circuit of the thyratron 85 and through the operating coil 77a of the relay 77 causes contacts 77b to open. The conduction of thyratron 70 is immediately cut off, thus deenergizing the clock mechanism 29 to accurately indicate the elapsed time for the ball 12 to move between the detectors 13 and 14. At the same time the relay 76 is de-energized and the lower resulting voltage at point 74a cuts off the thyratron 85. Now, upon movement of the switch 80 to its upper position and return of the ball 12 to a start position, the system is again conditioned to produce another measurement related to the viscosity of the liquid under test.

Now that the invention has been described and one complete embodiment thereof specifically set forth, it will be understood that modifications will now suggest themselves to those skilled in the art and it is intended to cover such modifications as fall within the scope of the appended claims.

What is claimed is:

1. A viscometer for use with an impedance change responsive time measuring system for determining viscosities of fluids, comprising an elongated tube having a passage along its length for receiving a fluid to be tested, a ball having at least an outside metallic surface and adapted for rolling movement in the passage from one end of said tube toward the other end thereof through the fluid contained within the said tube when said tube is in an inclined position, and a pair of metallic probes spaced one from the other along the length of said tube and extending into the passage through wall structure of said tube, each of said probes being spaced from said ends of said tube, said probes having needle-like end portions positioned in the path to be taken by said ball for establishing conductive connection with said ball as the center thereof passes over the end of each of said probes, said tube comprised at least in part of metallic structure disposed in the vicinity of and insulated from each probe, said ball upon conductive connection with each of said probes changing the impedance between said probes and said metallic structure.

2. The viscometer of claim 1 in which said metallic structure forms at least a portion of the inside wall structure of said tube.

3. In a system in which the time interval is measured for a moving object to pass through a fluid between two spaced points to determine the viscosity of the fluid, the combination of an elongated metallic tube for containing a fluid whose viscosity is to be measured, said tube having internal wall structure, a metallic ball adapted to move from one end of said tube toward another end of said tube through the fluid when said tube is in an inclined position, and a pair of capacitors each including as one of its electrodes said internal wall structure of said tube, another electrode of each of said capacitors being provided by structure extending through said tube along sides thereof and at points spaced from said ends thereof, and means for insulating said other electrodes from said wall structure, said electrode structure having needle-like end portions and extending into the path of said ball for electrical contact therewith during its movement from one end of said tube toward said other end of said tube, said capacitors having a finite value of capacitance, said ball upon electrical contact with each of said needle-like end portions only substantially increasing the effective area of said end portions to increase the capacitance of each of said capacitors.

4. A viscometer for use with an impedance change responsive time measuring system for determining viscosities of fluids, comprising an elongated tube having two closed ends and a passage along its length for containing a fluid to be tested, an inlet extending through wall structure of said tube to said passage for receiving the fluid to be tested, a ball having at least an outside metallic surface and adapted for rolling movement in the passage from one end of said tube toward the other end thereof through the fluid contained within said tube when said tube is in an inclined position, and a pair of metallic probes extending into the passage through wall structure of said tube, said probes having needle-like end portions spaced from said ends of said tube and positioned in the path to be taken by said ball for establishing conductive connection with said ball, said tube comprised at least in part of metallic structure disposed in the vicinity of and insulated from each probe, said ball upon conductive connection with each of said probes changing the impedance between said probes and said metallic structure.

5. An impedance change responsive time measuring system for determining viscosities of fluids, comprising an elongated metallic tube having a passage along its length for receiving a fluid to be tested, a pair of metallic probes extending into the passage through wall structure of said tube and having needle-like end portions spaced from ends of said tube, at least one of said metallic probes extending into the passage through side wall structure of said tube, means for insulating said probes from said wall structure, a metallic ball adapted to roll from one end of the passage of the tube toward the other end thereof through the fluid contained therein when said tube is in an inclined position to conductively contact each of said probes to change the impedance between said probes and said wall structure, an impedance bridge circuit responsive to impedance changes interconnected with said probes and said wall structure for producing an output pulse each time an impedance change takes place between said probes and said wall structure, and means interconnected with said impedance bridge circuit and responsive to output pulses from said circuit for measuring the time required for said ball to move from the end portion of one probe to the end portion of the other probe.

6. The viscometer of claim 1 wherein the needle-like end portions of the electrodes are adjustable with respect to the inner surface of the tube wall structure.

References Cited in the file of this patent

UNITED STATES PATENTS 2,154,376     Cline _____ Apr. 11, 1939
2,388,387     Cohen _____ Nov. 6, 1945

OTHER REFERENCES

Technical Publication entitled "Viscosity Determination of Sub-Surface Samples of Crude Oil" by Exline et al. Photostat copy in Div. 36, pp. 659 and 660.